United States Patent
Zhang et al.

(10) Patent No.: US 11,521,067 B2
(45) Date of Patent: Dec. 6, 2022

(54) DECENTRALIZED DISTRIBUTED DEEP LEARNING

(71) Applicant: INTERNATIONAL BUSINESS MACHINES CORPORATION, Armonk, NY (US)

(72) Inventors: Wei Zhang, Elmsford, NY (US); Li Zhang, Yorktown Heights, NY (US); Ulrich Finkler, Mahopac, NY (US); Minsik Cho, Austin, TX (US); David Kung, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1042 days.

(21) Appl. No.: 16/206,274

(22) Filed: Nov. 30, 2018

(65) Prior Publication Data

US 2020/0175370 A1 Jun. 4, 2020

(51) Int. Cl.
| | | |
|---|---|---|
| *G06N 3/08* | (2006.01) | |
| *G06K 9/62* | (2022.01) | |
| *G06F 9/48* | (2006.01) | |
| *H04L 67/1097* | (2022.01) | |
| *G06F 17/16* | (2006.01) | |
| *G06N 20/00* | (2019.01) | |

(52) U.S. Cl.
CPC ........... *G06N 3/082* (2013.01); *G06F 9/4881* (2013.01); *G06F 17/16* (2013.01); *G06K 9/6215* (2013.01); *G06K 9/6257* (2013.01); *G06N 20/00* (2019.01); *H04L 67/1097* (2013.01)

(58) Field of Classification Search
CPC combination set(s) only.
See application file for complete search history.

(56) References Cited

U.S. PATENT DOCUMENTS

| | | |
|---|---|---|
| 9,489,373 B2 | 11/2016 | Simard et al. |
| 9,582,490 B2 | 2/2017 | Simard et al. |
| 9,672,474 B2 | 6/2017 | Dirac et al. |

(Continued)

FOREIGN PATENT DOCUMENTS

| | | |
|---|---|---|
| CN | 108304918 A | 7/2018 |
| EP | 3399418 A1 | 11/2018 |

(Continued)

OTHER PUBLICATIONS

Pan, X. et al.; Hemingway: Modeling Distributed Optimization Algorithms. UC Berkeley Feb. 20, 2017 (12 Pages).

(Continued)

*Primary Examiner* — Tuan C Dao
(74) *Attorney, Agent, or Firm* — Griffiths & Seaton PLLC

(57) ABSTRACT

Various embodiments are provided for decentralized distributed deep learning by one or more processors in a computing system. Asynchronous distributed training of one or more machine learning models may be performed by generating a list of neighbor nodes for each node in a plurality of nodes and creating a first thread for continuous communication according to a weight management operation and a second thread for continuous computation of a gradient for each node. One or more variables are shared between the first thread and the second thread.

18 Claims, 11 Drawing Sheets

(56) References Cited

U.S. PATENT DOCUMENTS

| | | | |
|---|---|---|---|
| 2007/0094060 A1* | 4/2007 | Apps | G06F 16/2428 705/7.36 |
| 2007/0192863 A1* | 8/2007 | Kapoor | H04L 9/40 726/23 |
| 2012/0284067 A1* | 11/2012 | Labat | G06Q 90/00 705/7.11 |
| 2013/0031252 A1* | 1/2013 | Chang | H04L 69/40 709/225 |
| 2014/0201126 A1* | 7/2014 | Zadeh | A61B 5/165 706/52 |
| 2015/0379426 A1* | 12/2015 | Steele | G06N 5/025 706/12 |
| 2016/0088006 A1* | 3/2016 | Gupta | H04L 41/16 706/12 |
| 2016/0325680 A1* | 11/2016 | Curtis | H04N 5/265 |
| 2017/0098171 A1* | 4/2017 | Kumar | G06N 3/084 |
| 2017/0169358 A1 | 6/2017 | Choi et al. | |
| 2017/0213132 A1 | 7/2017 | Hammond et al. | |
| 2017/0255621 A1* | 9/2017 | Kenthapadi | H04L 67/02 |
| 2018/0253816 A1 | 9/2018 | John | |
| 2018/0253817 A1 | 9/2018 | John | |
| 2018/0253818 A1 | 9/2018 | John | |
| 2018/0322386 A1 | 11/2018 | Sridharan et al. | |
| 2018/0349382 A1* | 12/2018 | Kumaran | G06F 17/12 |
| 2019/0108486 A1* | 4/2019 | Jain | G06N 3/0445 |
| 2020/0175370 A1* | 6/2020 | Zhang | G06N 20/00 |

FOREIGN PATENT DOCUMENTS

| | | |
|---|---|---|
| JP | 2018036779 A | 3/2018 |
| KR | 20170068360 A | 6/2017 |

OTHER PUBLICATIONS

Gupta, S. et al.; Model Accuracy and Runtime Tradeoff in Distributed Deep Learning: A Systematic Study Dec. 5, 2016 (10 Pages).

IPCOM000252018D, Predicting Computing Prices Dynamically Using Machine Learning Dec. 13, 2017 (35 Pages).

IPCOM000252271D, User Interfce and Application Programming Interface for Explaining Personalized Machine Learning Model Outputs Jan. 3, 2018 (34 Pages).

IPCOM000252683D, Incremental Sharing Using Machine Learning Feb. 1, 2018 (33 Pages).

Wang, Y. et al.; Nexus: Bringing Efficient and Scalable Training To Deep Learning Frameworks 2017 (10 Pages).

* cited by examiner

755

$$A_{\{18,32,54,76\}} = \begin{bmatrix} 1/2 & 0 & 0 & 0 & 0 & 0 & 0 & 0 \\ 0 & 1/2 & 1/2 & 0 & 0 & 0 & 0 & 0 \\ 0 & 1/2 & 1/2 & 0 & 0 & 0 & 0 & 0 \\ 0 & 0 & 0 & 1/2 & 1/2 & 0 & 0 & 0 \\ 0 & 0 & 0 & 1/2 & 1/2 & 0 & 0 & 0 \\ 0 & 0 & 0 & 0 & 0 & 1/2 & 1/2 & 0 \\ 0 & 0 & 0 & 0 & 0 & 1/2 & 1/2 & 0 \\ 0 & 0 & 0 & 0 & 0 & 0 & 0 & 1/2 \end{bmatrix}$$ —750

$$A_{\{14,36,58,72\}} \; A_{\{12,34,56,78\}} = \begin{bmatrix} 1/4 & 1/4 & 1/4 & 1/4 & 0 & 0 & 0 & 0 \\ 1/4 & 1/4 & 0 & 0 & 0 & 0 & 1/4 & 1/4 \\ 0 & 0 & 1/4 & 1/4 & 1/4 & 1/4 & 0 & 0 \\ 1/4 & 1/4 & 1/4 & 1/4 & 0 & 0 & 0 & 0 \\ 0 & 0 & 0 & 0 & 1/4 & 1/4 & 1/4 & 1/4 \\ 0 & 0 & 1/4 & 1/4 & 1/4 & 1/4 & 0 & 0 \\ 1/4 & 1/4 & 0 & 0 & 0 & 0 & 1/4 & 1/4 \\ 0 & 0 & 0 & 0 & 1/4 & 1/4 & 1/4 & 1/4 \end{bmatrix}$$ —760

$$A_{\{18,32,54,76\}} \; A_{\{14,36,58,72\}} \; A_{\{12,34,56,78\}} = \begin{bmatrix} 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \\ 1/8 & 1/8 & 1/8 & 1/8 & 1/8 & 1/8 & 1/8 & 1/8 \end{bmatrix}$$ —780

FIG. 7B

DECENTRALIZED DISTRIBUTED DEEP LEARNING

BACKGROUND OF THE INVENTION

Field of the Invention

The present invention relates in general to computing systems, and more particularly to, various embodiments for decentralized distributed deep learning in a computing system using a computing processor.

Description of the Related Art

Computing systems may be found in the workplace, at home, or at school. Due to the recent advancement of information technology and the growing popularity of the Internet, a wide variety of computer systems have been used in machine learning. Machine learning is a form of artificial intelligence that is employed to allow computers to evolve behaviors based on empirical data. Machine learning may take advantage of training examples to capture characteristics of interest of their unknown underlying probability distribution. Training data may be seen as examples that illustrate relations between observed variables. A major focus of machine learning research is to automatically learn to recognize complex patterns and make intelligent decisions based on data.

SUMMARY OF THE INVENTION

Various embodiments for decentralized distributed deep learning by one or more processors in a computing system, are provided. In one embodiment, by way of example only, a method for decentralized distributed deep learning in a computing system, again by a processor, is provided. Asynchronous distributed training of one or more machine learning models may be performed by generating a list of neighbor nodes for each node in a plurality of nodes and creating a first thread for continuous communication according to a weight management operation and a second thread for continuous computation of a gradient for each node. One or more variables are shared between the first thread and the second thread.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 7A-7B are diagrams depicting operations for generating a neighbor list for decentralized distributed deep learning according to an embodiment of the present invention;

DETAILED DESCRIPTION OF THE DRAWINGS

Figure 1:
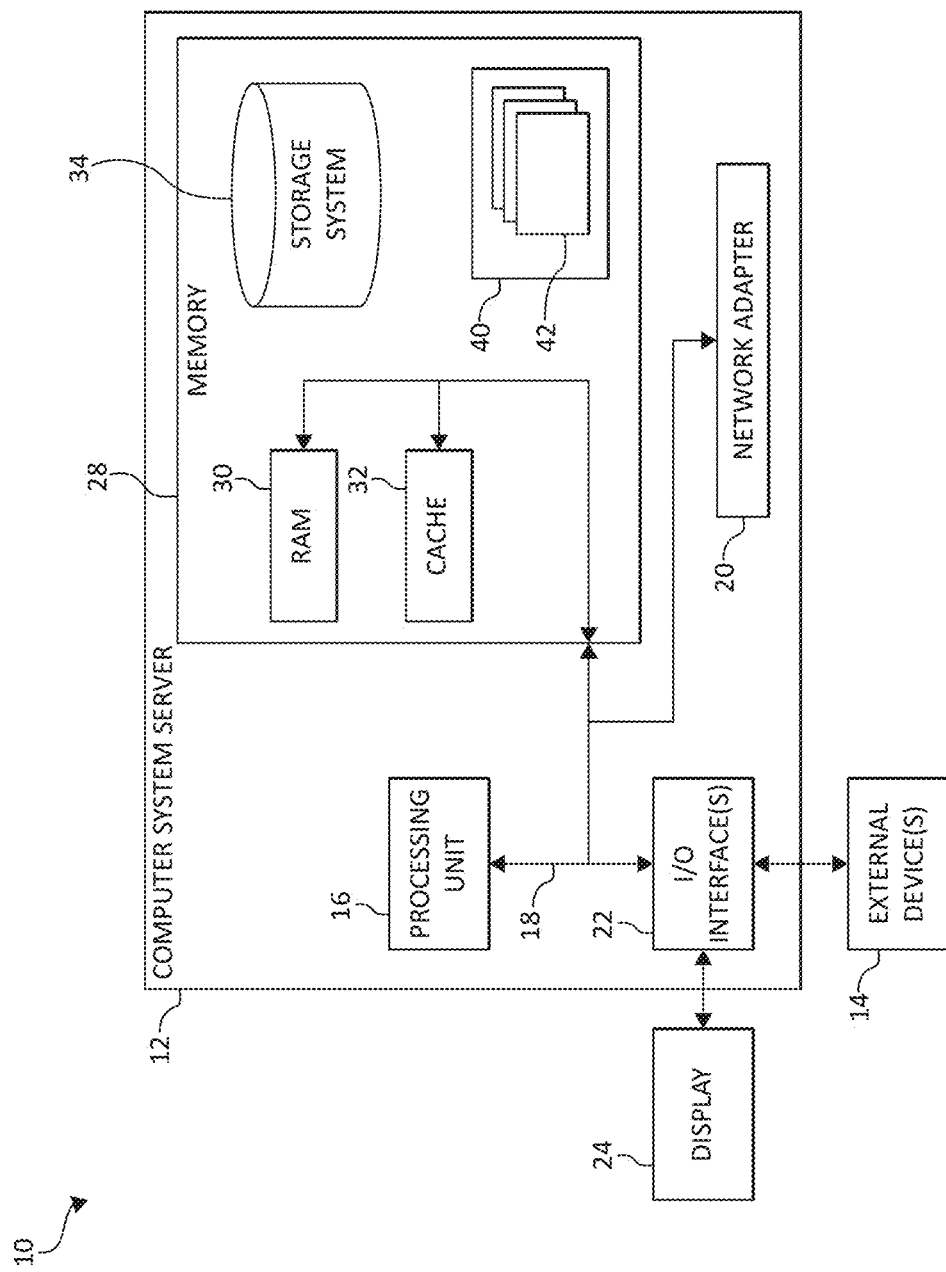
FIG. 1 is a block diagram depicting an exemplary cloud computing node according to an embodiment of the present invention.

The present invention relates generally to the field of deep learning, and more specifically to executing multi-directional reduction in deep-learning implementations. Deep-learning refers to a class of machine learning algorithms that are based on the learning of multiple levels of features or representations of a set of data. Current deep-learning methods include using a cascade of multiple layers of nonlinear processing units for feature extraction and transformation. Feature extraction refers to the process of receiving an initial set of measured data and building derived values (or features) to facilitate subsequent learning and generalization steps. In many cases, higher level features are derived from lower level features to generate a hierarchical representation of the measured data and the derived features.

Moreover, deep learning algorithms are based on distributed representations. Distributed representations operate under the assumption that observed (or measured) data are the result of interactions of one or more factors organized into one or more layers. Conceptually, deep learning introduces an additional assumption that the layers of factors that interact to provide the measured data are representative of levels of abstraction or composition. Under this assumption, multiple layers and layer sizes correspond to different amounts of abstraction.

Any or all of the data utilized and created in a deep-learning system may be transmitted across one or more networks and may subsequently be subject to any limitations of said one or more networks. In particular, with respect to large scale deep-learning systems, any network communication may be subject to a bottleneck due to a large number of learners (e.g., workers), the frequency of data exchange across the network, and the volume of the data being exchanged. It should be noted that a learner/worker may be an application (e.g., a piece of code_ that takes in input, performs one or more necessary computations and communication to iteratively generate more accurate and efficient solutions. In the context of this patent application, the weight management thread and gradient computation thread are both parts of the learner/worker process. Furthermore, communication across a multi-tiered network can be largely inefficient, as the weakest link or node in the network will largely dictate how the network will perform as a whole.

Additionally, one or more challenges may arise when training a deep learning system. In a distributed cloud computing environment, for example, due to the heterogeneous environment, computing devices may vary in processing speed (e.g., slow/fast computing), uneven network connectivity (e.g., fast/slow speed network links, different network differences, etc.), and even different levels of system noise. Also, due to the elasticity of the distributed cloud computing environment, computing devices dynamically become available. In neural network ("NN") training, synchronous training is rigid and uncontrolled asynchronous often leads to inefficient or inaccurate training results. Thus, a need exists for a distributed training system with disciplined actions to increase training result accuracy while adapting to the heterogeneous and elastic computing environments so as to utilize all available computing resources.

Thus, the present invention provides for decentralized distributed deep learning in a computing system. Asynchronous distributed training of one or more machine learning models may be performed by generating a list of neighbor nodes for each node in a plurality of nodes and creating a first thread for continuous communication according to a weight management operation and a second thread for continuous computation of a gradient for each node. One or more variables are shared between the first thread ("Thread 1") and the second thread ("Thread 2"). It should be noted that machine learning and deep learning models have numerous parameters. The training process is to determine the best/optimal value assignments to the parameters such that the models match the data as closely as possible. These model parameters are also called weights (e.g., weight parameters). For example, an example management/update equation for the weight is:

$$\text{new}_{weight} = \text{old}_{weight} + \text{learning}_{rate} * \text{gradient}, \quad (1)$$

where "gradient" is what is produced by a gradient computation thread (e.g., Thread 2) and the learning$_{rate}$ is selected/defined value, which may be smaller than the gradient. In one aspect, the weight management operation for the first thread (e.g., Thread 1) may be in communication with one or more application programming interfaces ("APIs") with downlink framework capacities. For example, the following equations may be used for Thread 1 (weight management):

$$W' = \text{pull}_{weights} \quad (2),$$

$$W = \text{weight}_{apply}(W', g) \quad (3),$$

And for Thread 2 (gradient computation):

$$g = \text{calGrad}(W) \quad (4),$$

$$\text{push}_{gradient}(g) \quad (5),$$

where W' is equal to pull$_{weights}$ ( ), where W is equal to weight$_{apply}$(W',g) and g is previous calculated gradient (e.g., gradient calculated last/previous round). The gradient computation may be where the gradient ("g") is equal to calGad (W) and push$_{gradient}$ (g).

By way of further explanation, Thread 2 is equal to the equation "g=calGrad(W)" that indicates that based on the current weights (model parameters) W, Thread2 will calculate a gradient g using the function calGrad( ). Then the push$_{gradient}$ (g) action/operation sends the gradient g to Thread 1. Thread 1 (e.g., W=weight$_{apply}$(W',g)) performs the weight$_{apply}$ action/operation using the equation (1), above. Thread 1 also performs the W'=pull$_{weights}$ action/operation to receive the weights from the next neighbor in its neighbor list. Thread 1 performs the average of its weight with the received neighboring weights to generate a new weight. This new weight is sent to Thread 2 for its computation.

In an additional aspect, the present invention provides for asynchronous distributed training of machine learning models by separately conducting computation and communication on each learner (trainer). In one aspect, a neighbor list may be constructed for each learner. The neighbor list satisfies connectivity, dissemination, deadlock free properties. A first thread (e.g., "Thread 1") is created for continuous communication and a weight update satisfies data consistency property. A second thread (e.g., "Thread 2") is created for continuous computation. Shared variables, local gradients, and weight factor may be shared to communicate between Thread 1 and Thread 2. A failure detection operation may be used to detect remote node/link failures to maintain progress. In one aspect, the failure detection operation may be a time out operation where operation continue to the next operation if communication with a neighbor does not return after a time out value. Also, in an additional aspect, a data consistency operation may be an atomic data consistency operation. That is, the data consistency operation maintains data consistency by restricting (e.g., not allowing) any weight update operation at a local learner when weights are being transmitted and averaged.

It should be noted that one or more calculations may be performed using various mathematical operations or functions that may involve one or more mathematical operations (e.g., performing rates of change/calculus operations, solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

In general, "optimize" may refer to and/or defined as "maximize," "minimize," or attain one or more specific targets, objectives, goals, or intentions. Optimize may also refer to maximizing a benefit to a user (e.g., maximize a machine learning model benefit). Optimize may also refer to making the most effective or functional use of a situation, opportunity, or resource.

Additionally, "optimize" need not refer to a best solution or result but may refer to a solution or result that "is good enough" for a particular application, for example. In some implementations, an objective is to suggest a "best" combination of machine learning models, but there may be a variety of factors that may result in alternate suggestion of a combination of machine learning models yielding better results. Herein, the term "optimize" may refer to such results based on minima (or maxima, depending on what parameters are considered in the optimization problem). In an additional aspect, the terms "optimize" and/or "optimizing" may refer to an operation performed in order to achieve an improved result such as reduced execution costs or increased resource utilization, whether or not the optimum result is actually achieved. Similarly, the term "optimize" may refer to a component for performing such an improvement operation, and the term "optimized" may be used to describe the result of such an improvement operation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
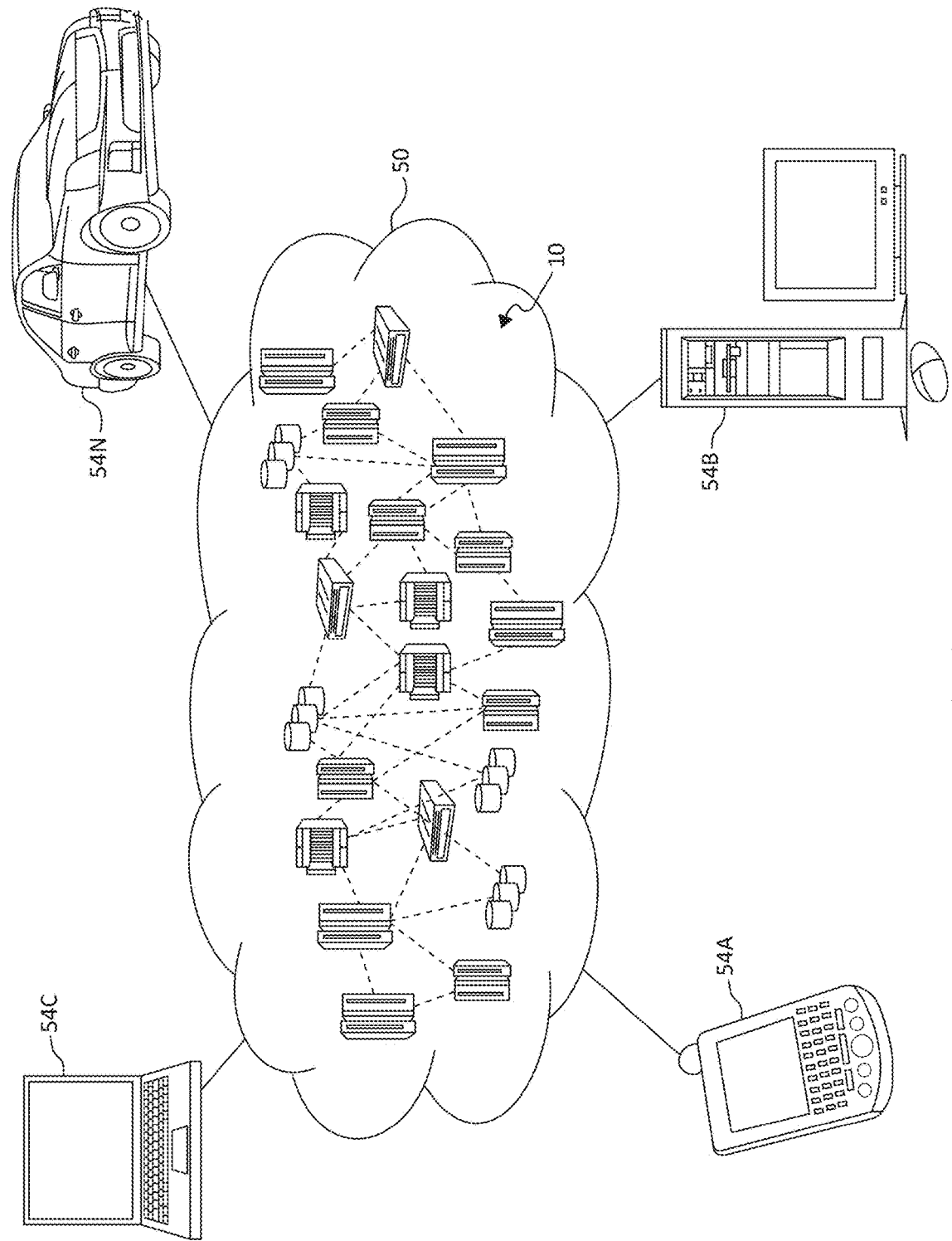
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
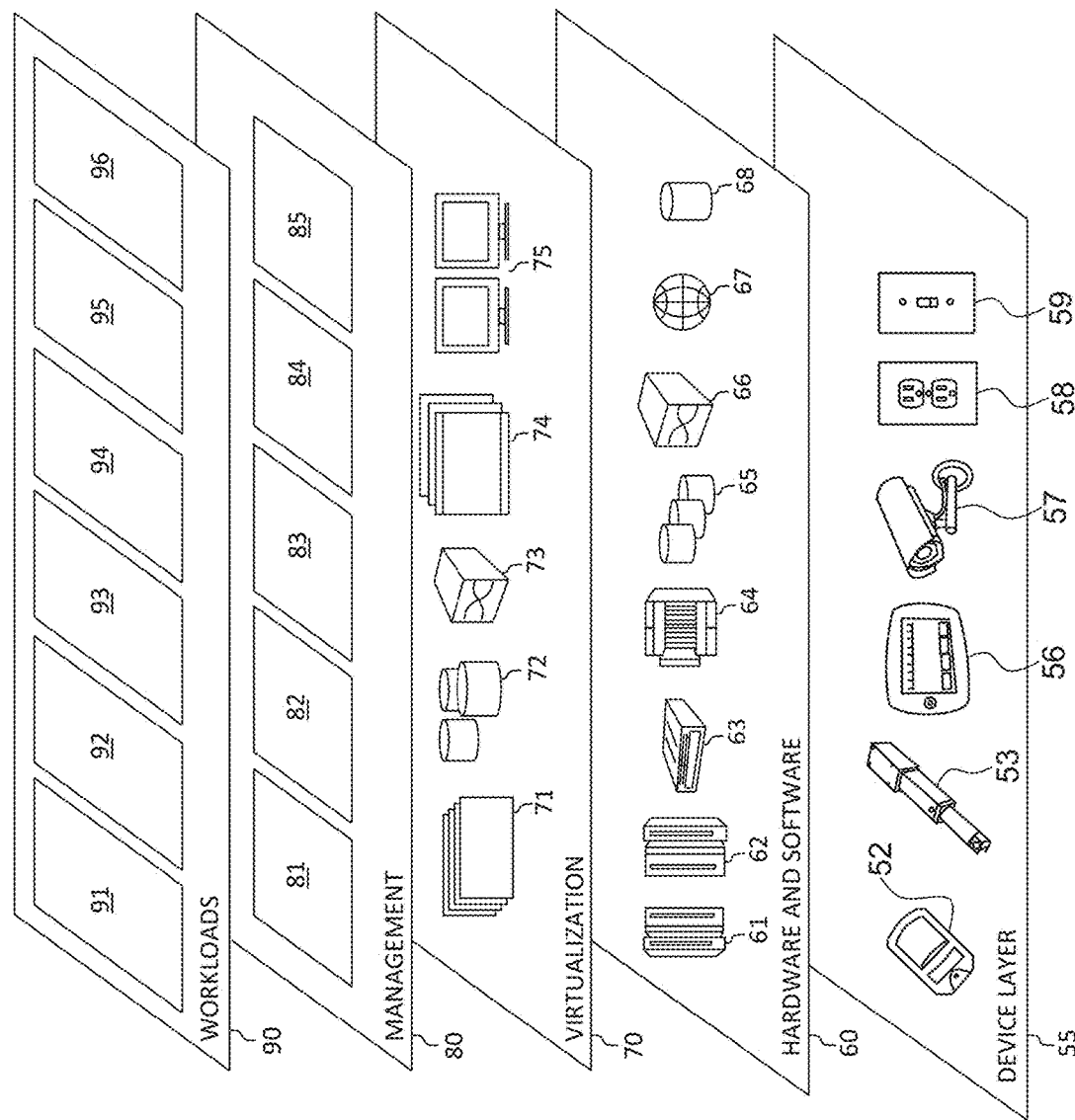
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for decentralized distributed deep learning. In addition, workloads and functions 96 for decentralized distributed deep learning may include such operations as analytics, entity and obligation analysis, and as will be further described, user and device management functions. One of ordinary skill in the art will appreciate that the workloads and functions 96 for decentralized distributed deep learning may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

As previously mentioned, the mechanisms of the illustrated embodiments provide novel approaches for decentralized distributed deep learning in a computing environment. In one aspect, each learner may have a stream of its own input data and a pre-defined list of neighbors where one or more rules are used for creating the neighbor list). It should be noted that the learner is a process running on a node. A learner process may have multiple threads running concurrently. A first thread (e.g., "Thread 1") and a second thread (e.g., "Thread 2") may be created. The first thread may perform a weight management operation. The weight management operation may include obtaining a local gradient to obtain an updated local weight (of a neural network "NN"). If more than one local gradient is received from the second thread, then all local gradients are received. The local gradient may be set equal to zero to avoid applying a local gradient more than once, especially if a weight exchange is too fast (e.g., greater than a weight exchange threshold). A next neighbor from the list neighbors may be selected. Weights may be exchanged between the local node and the selected neighbor and the weights to form a new weight vector.

The second thread may perform a gradient computation. The gradient computation operation may continuously compute local gradients for each node based on each nodes input data (e.g., mini-batch) and its current weight (e.g., asynchronous training). The gradient computation operation may send the computed local gradient to the first thread. If the new weight vector from the first thread (e.g., Thread 1) is available, the new weight vector may be assigned to the current weight, otherwise, the current weight is maintained. The weight vector can be updated from a local result by applying the update equation. The weight vector can also be updated as the average of the current weight and the weight from a remote neighbor. As requirements for operation of the present invention, when weights are being transmitted and averaged, no weight update is allowed at a local learner. In the event that first thread (e.g., Thread 1) is busy exchanging weights with other nodes, the local gradient in the first thread may be placed in a queue it for next round. The current weight used by the second thread (e.g., Thread 2) is always results from the weight exchange in the first thread (e.g., Thread 1).

Figure 4:
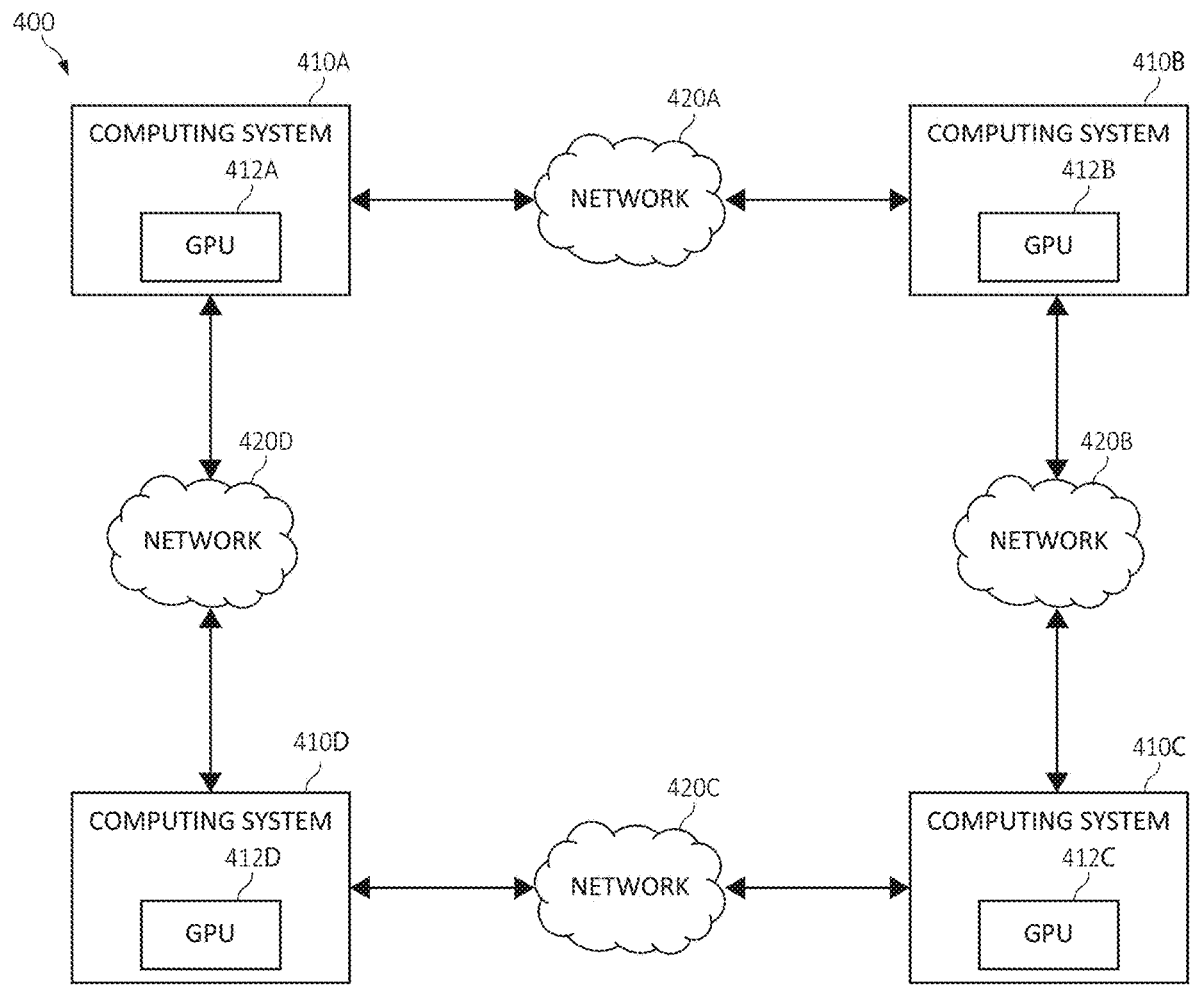
FIG. 4 is an additional block diagram depicting a deep learning system in accordance with another embodiment of the present invention.

FIG. 4 is a functional block diagram depicting a deep learning system 400 in accordance with some embodiments of the present invention. As depicted, deep learning system 400 includes computing systems 410A, 410B, 410C, and 410D (e.g., computing system 12 of FIG. 1) and a plurality of networks 420A, 420B, 420C, and 420D. The deep learning system 400 may be a multidimensional reduction system that enables improved efficiency in communication within a deep learning environment.

Computing systems 410A, 410B, 410C, and 410D can be desktop computers, laptop computers, specialized computer servers, or any other computer systems known in the art. In some embodiments, computing systems 410A, 410B, 410C, and 410D represent computer systems utilizing clustered computers and components to act as a single pool of seamless resources. In general, computing systems 410A, 410B, 410C, and 410D are representative of any electronic devices, or combinations of electronic devices, capable of executing machine-readable program instructions.

As depicted, each computing system 410A, 410B, 410C, and 410D includes a graphics processing unit (GPU) 412A, 412B, 412C, and 412D, respectively. Each GPU 412A, 412B, 412C, and 412D is a circuit designed to manipulate and alter memory to facilitate creation of images for display. In at least one embodiment, GPUs 412A, 412B, 412C, and 412D are configured to execute multidimensional reduction algorithms according to a multidimensional reduction method.

Each of networks 420A, 420B, 420C, and 420D, can be, for example, a local area network (LAN), a wide area network (WAN) such as the Internet, or a combination of the two, and include wired, wireless, or fiber optic connections. In general, networks 420A, 420B, 420C, and 420D can be any combination of connections and protocols that will support communications between computing systems 410A, 410B, 410C, and 410D in accordance with an embodiment of the present invention. In at least one embodiment of the present invention, networks 420A, 420B, 420C, and 420D facilitate data transmissions between computing systems 410 within a deep learning system 400.

Figure 5:
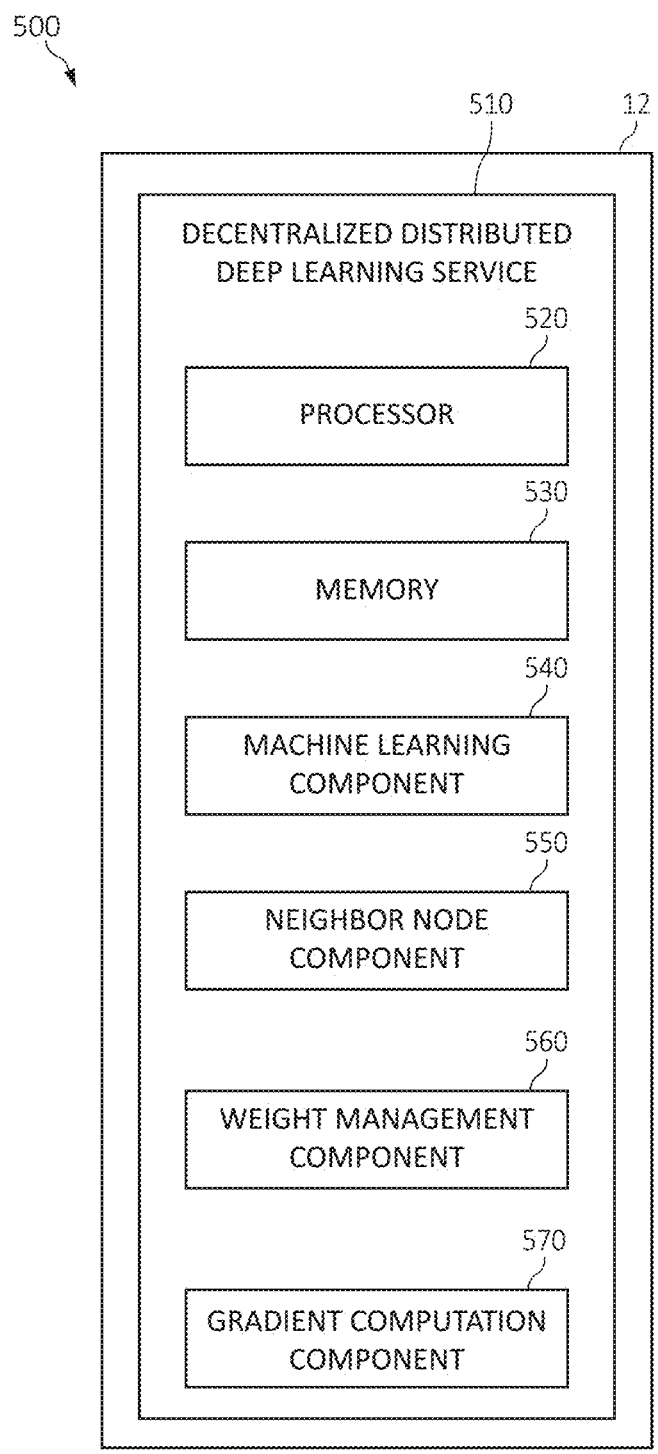
FIG. 5 is an additional block diagram depicting various user hardware and computing components functioning in accordance with aspects of the present invention

Turning now to FIG. 5, a block diagram depicting exemplary functional components 500 according to various mechanisms of the illustrated embodiments is shown. In one aspect, one or more of the components, modules, services, applications, and/or functions described in FIGS. 1-4 may be used in FIG. 5. A decentralized distributed deep learning service 510 is shown, incorporating processing unit ("processor") 520 to perform various computational, data processing and other functionality in accordance with various aspects of the present invention. The decentralized distributed deep learning service 510 may be provided by the computer system/server 12 of FIG. 1 and/or deep learning system 400 of FIG. 4. The processing unit 520 may be in communication with memory 530. The decentralized distributed deep learning service 510 may include a machine learning component 540 (e.g., deep learning component), a neighbor node component 550, and/or a weight management component 560, and a gradient computation component 570, each of which may be in communication with each other.

As one of ordinary skill in the art will appreciate, the depiction of the various functional units in decentralized distributed deep learning service 510 is for purposes of illustration, as the functional units may be located within the decentralized distributed deep learning service 510 or elsewhere within and/or between distributed computing components. In one embodiment, by way of example only, the decentralized distributed deep learning service 510 may modularly construct a neural network ("NN") for deep learning problem.

The machine learn component 540, in association with the neighboring node component 550, the weight management component 560, and the gradient computation component 570, may perform asynchronous distributed training of one or more machine learning models by generate list of neighbor nodes for each node in a plurality of nodes and creating a first thread for continuous communication according to a weight management operation and a second thread for continuous computation of a gradient for each node by sharing one or more variables are shared between the first thread and the second thread in a computing environment (e.g., a heterogenous and/or elastic computing environment). The machine learning component 540 may perform a failure detection operation to detect one or more failures of one or more of the plurality of nodes or links in the list of neighbor nodes.

More specifically, the neighboring node component 550 may identify a list of neighboring nodes for a local node in a deep learning network. The neighboring node component 550 may generate a list of the neighboring nodes for the local node.

The weight management component 560 may create a first thread and apply a gradient of the local node from the list of neighbor nodes obtained from the second thread to 1) obtain an updated weight of the selected node, 2) set the gradient equal to a zero value, 3) select a neighbor node from the list of neighbor nodes, and/or 4) exchange weights with the local neighbor node and averaging the exchanged weights to generate a weighted vector. The weight management component 560 may restrict a weight from being updated at a selected node in the list of neighbor nodes when one or more weights are transmitted and averaged to maintain data consistency.

The gradient computation may define the continuous computation of the gradient for the second thread for each of the nodes to include: continuously determining a gradient for a selected node from the list of neighbor nodes based on input data of the selected node, sending the determined gradient of the selected node to the first thread, and/or assigning weighted vector received from the first thread to a current weight of the selected node.

The machine learning component 540 may maintain a plurality of required properties by each node included in the list of neighbor nodes. The plurality of required properties may include a connectivity property where each node included in the list of neighbor nodes are connected, a dissemination property, a deadlock free property to ensure continuous progression of each operation, and the data consistency property.

The machine learning component 540 may skip a neighbor node in the list of neighbor nodes (for performing one or more operations) upon failure to receive a communication response from the neighbor node prior to expiration of a time period.

Figure 6:
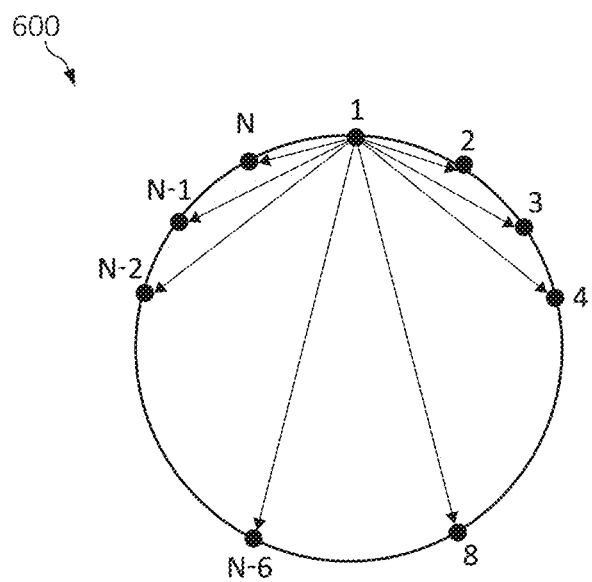
FIG. 6 is an additional block diagram depicting a neighbor list for decentralized distributed deep learning according to an embodiment of the present invention.

Consider the following example illustrated in FIG. 6 of an implementation of the aforementioned functionality of FIGS. 1-5. FIG. 6 depicts an example of a neighbor list 600 for decentralized distributed deep learning. Each learner (e.g., learner 1 or "node 1" in FIG. 6) has a list of its neighbors. That is, by way of example only, node 1 may traverse in one direction (e.g., looks to its left) and may include one or more nodes, and then may traverse in another direction (e.g., looks to its right) and selects a few additional node, then goes back to the first direction (e.g., left) and skip a few nodes, then to switches back to the alternative direction (e.g., right) and skip a few nodes. As such, node 1's neighbor list may be nodes 1-4, 8, node n−6, node n−2, node n−1, and node n. That is, node 1's neighbor list may be $N(1)=(2, n, 4, n-2, 8, n-6, \ldots, n+2^i, -(n-2+2^i), \ldots$ until $i=floor(\log\_2(n))$.

The list of neighbor nodes selected may have one or more required properties that include 1) a connectivity property, 2) a dissemination property, 3) a deadlock free property, and 4) a data consistency property. That is, the plurality of required properties may include the connectivity property where each node included in the list of neighbor nodes are connected, the dissemination property, the deadlock free property to ensure continuous progression of each operation, and the data consistency property. By skipping a defined/select number of nodes, node 1 can reach further distance with selected number of steps. Reaching further distance with the selected number of steps while skipping a number of nodes is what the "dissemination" property refers to. It should be note that one or more alternative operations may be used to build the neighbor list. However, the present invention may select one of the alternative operations to reach the furthest number of neighbor nodes within a selected number of steps.

Using the example of FIG. 6 where N (neighbors) is equal to 8, node 1's neighbor list is: $N(1)=(2, 8, 4, 6)$, node 2's neighbor list is: $N(2)=(3, 9, 5, 7)=(3, 1, 5, 7)$. When N is equal to 9, node 1 and node 9 are the same. Node 3's neighbor list is: $N(3)=(4, 2, 6, 8)$. Also, a generic expression may be $N(j)=H+N(1)$.

Thus, as an additional example, consider the node "j" and the neighbor list of node "j" may be $j-1+N(1)$ when j is an odd number (e.g., connectivity and dissemination). It should be noted that even numbers do not initiate communication (e.g., deadlock free). In one aspect, a deadlock situation is a situation where node A is waiting to hear back from node B and, at the same time, node B is waiting to hear back from node A, but neither node A or node B is aware of the situation so they both wait. This can happen if both node A and node B initiate communication at the same time. Here, the present invention only allows nodes with odd indices (or "even" indices based on user preference) to initiate communications to nodes with even indices (or "odd" indices based on user preference). This avoids the deadlock situation. When weights are being transmitted and averaged to the various nodes, no weight update is allowed at a local learner (e.g., atomic data consistency).

Figure 7A:
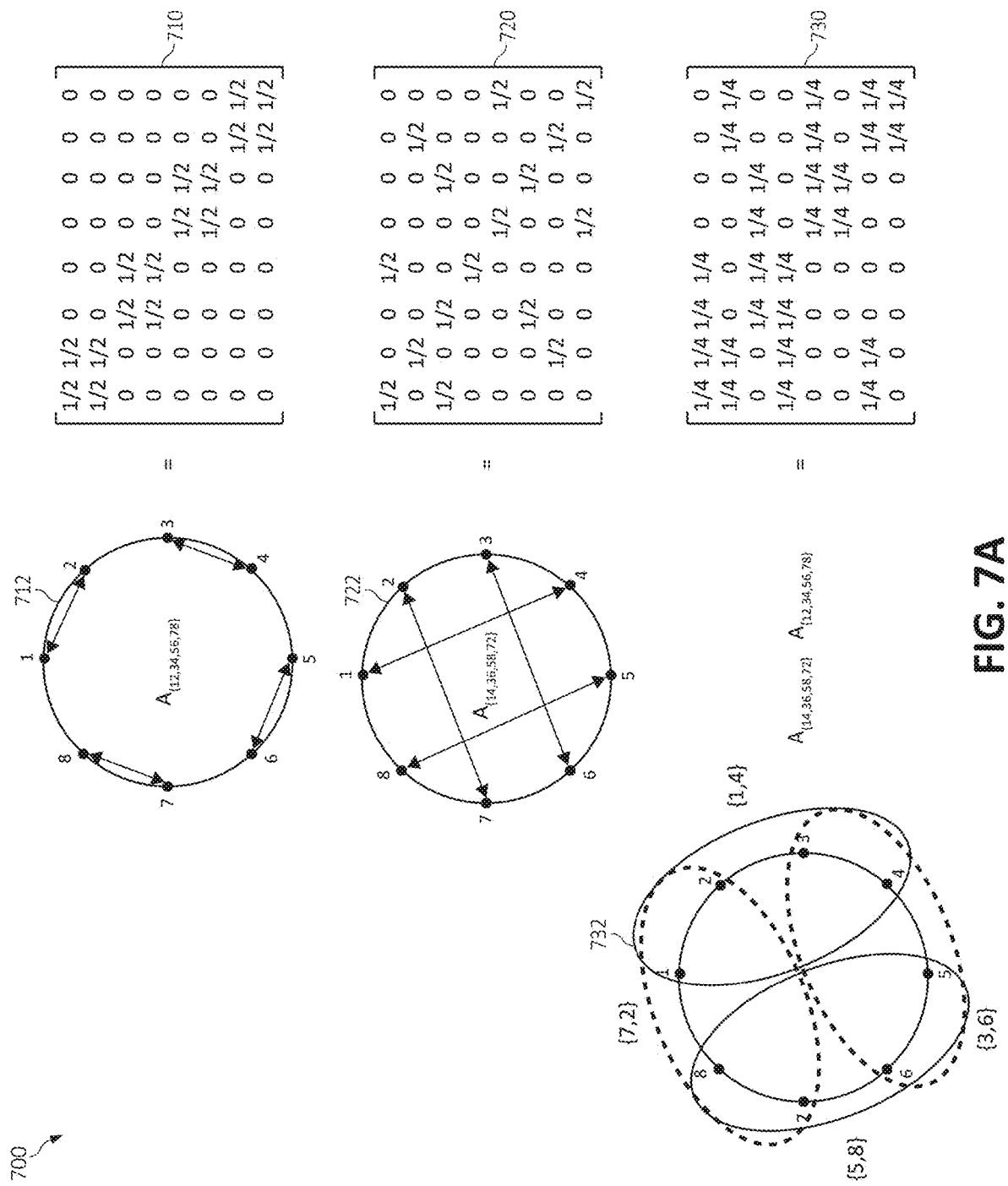

Turning now to FIG. 7A-7B, diagrams depicting operations 700, 755 for generating a neighbor list for decentralized distributed deep learning using 8-nodes. The decentralized distributed deep learning may be provided by the computer system/server 12 of FIG. 1 and/or the deep learning systems of FIGS. 4 and 5.

In one aspect, the neighbor list for the 8 nodes (e.g., nodes 1-8) may be generated by traversing in only one direction leading to the neighbor list N(1)=: (2, 4, 8). It should be noted that the even-indexed nodes (e.g., nodes 2, 4, 6, and 8) do not initiate communication, thus only the neighbor list for the odd-indexed nodes communicate (e.g., synchronous communication) where N(3):=(4, 6, 2), N(5):=(6, 8, 4), and N(7):=(8, 2, 6). These neighbor lists are built from N(1) by shifting clockwise by 2 steps each time. In one aspect, the steps as used herein represent an operational step for selecting a neighbor to be included in this list (e.g., look both clockwise and counter clockwise and FIG. 7A-7B only look clockwise).

Now assume each node holds a number, node i holds a number $x_i$. Now assume all the nodes just finished their computation and are ready for the communication step to exchange $x_i$'s. For example, node 1 sends $x_i$. to node $x_1$. Node 2 sends $x_1$ to node 1. Node 1 computes the average of $x_1$ and $x_2$ and Node 2 also computes the average of $x_1$ and $x_2$. At this same time, node 3 and node 4 exchange $x_3$ and $x_3$ and compute the average. Node 5 and node 6 exchange $x_5$ and $x_6$ and compute the average. Node 7 and node 8 exchange $x_7$ and $x_8$ and compute the average, using the following equation:

$$new_{weights} = \frac{(localnode_{weight} + neighbornode_{rate})}{2}, \quad (6)$$

If all communications (e.g., receiving the weights from neighbors and sending local-weights to neighbors) happen at the same time and consume substantially the same amount of time, then after each of the node are completed, the present invention provides for node 1 and node 2 to have $(x_1+x_2)/2$, node 3 and node 4 have $(x_3+x_4)/2$, node 5 and node 6 have $(x_5+x_6)/2$, node 7 and node 8 have $(x_7+x_8)/2$, which mathematically corresponds to: $[x_1\_new1, x_2\_new1, x_3\_new1, x_4\_new1, x_5\_new1, x_6\_new1, x_7\_new1, x_8\_new1]=A_{\{12,34,56,78\}}*[x_1, x_2, x_3, x_4, x_5, x_6, x_7, x_8]$, where A is a symmetric, stochastic matrix, as illustrated in matrixes 710 and circle 712.

In an additional step, the neighbors are (1,4), (3,6), (5,8), (7,2) as illustrated in circle 722. Then after communications between these neighbors, circle 722 illustrates $[x_1\_new2, x_2\_new2, x_3\_new2, x_4\_new2, x_5\_new2, x_6\_new2, x_7\_new2, x_8\_new1]$ that equals (=) matrix 720, where $A_{\{14,36,58,72\}}$ $[x_1\_new1, x_2\_new1, x_3\_new1, x_4\_new1, x_5\_new1, x_6\_new1, x_7\_new1, x_8\_new1]=A_{\{14,36,58,72\}}*A_{\{12,34,56,78\}}*[x_1, x_2, x_3, x_4, x_5, x_6, x_7, x_8]$, as illustrated in matrix 720.

The product of $A_{\{14,36,58,72\}}*A_{\{12,34,56,78\}}$ is depicted in matrix 730, which illustrates that node 1 and node 4 get the average weights of $x_1, x_2, x_3, x_4$. Node 5 and node 8 get the average weights of $x_5, x_6, x_7, x_8$]. Node 3 and node 6 get the average of $x_3, x_4, x_5, x_6$. Node 7 and node 2 the average weights of $x_7, x_8, x_1, x_2$, which node pairing of node 1 and node 4, node 5 and node 8, node 3 and node 6, and node 7 and node 2 are illustrated in the ellipses of node pairing list circle 732.

Turning now to an additional step, as illustrated in FIG. B, the neighbors may be selected as (1,8), (3,2), (5,4), (7,6). Then after this step, all the nodes have the average of $x_1, \ldots, x_8$, as illustrated in the product of 3 matrices 750, 760, and 780. That is, $A_{\{18,32,54,76\}}$ equal matrix 750. The product of $A_{\{14,36,58,72\}}*A_{\{12,34,56,78\}}$ is depicted in matrix 760. The product of $A_{\{18,32,54,76\}}*A_{\{14,36,58,72\}}*A_{\{12,34,56,78\}}$ is depicted in matrix 780. This means that if all the communications take roughly the same time, after 3 steps, a perfect mixing of $x_1, \ldots, x_8$, may be achieved. If the nodes and links have different speeds, these communications may not occur in a synchronous manor. The mixing of the nodes may yield different results. However, as long as similar restrictions/disciplined operations are performed for maintaining connectivity, dissemination, deadlock free, and data consistency properties, similar and/or more efficient/optimized results (e.g., training results) are produced.

In one aspect, a failure detection operation may be performed to determine if one or more of the plurality of nodes or links in the list of neighbor nodes experiences fault tolerance issues. For example, a failure detection operation for node abnormalities may be performed for a slow node, a failed node, and also assist with node recovery.

The slow node may be a slow local node where compute times are exceeding a defined threshold or are longer than other compute times causing fewer local gradient calculations and/or weight updates to be performed, but the deep learning system is still progressing.

The failed node may be a remote failed node where a neighbor's weight has not been received and the failure detection operation will detect the failure and skipped this detected failed node.

For node recover, when a local node recovers from a failure, the recovered node may request a current weight from one of a plurality of neighbor nodes to start the computation (e.g., gradient g computation).

Similarly, the failure detection operation for node abnormalities may be performed for a slow link, a failed link, and also assist with link recovery.

The slow link of a local node behavior and remote node behavior may include weight exchange times that exceed a defined time threshold (e.g., long exchange times) which may yield multiple outstanding local gradient, but the deep learning system is still progressing.

A failed link of local node behavior may include the local node's computation failing to contribute globally to the list of neighbor nodes. Thus, the failed link is required to be repaired for enabling sharing computations (e.g., weights and gradients) with the list of neighbor nodes.

A failed link of remote node behavior may include the remote node failing to receive a local node's contribution. Thus, the failed link to the remote node is required to be repaired for enabling the local node to share computations (e.g., weights and gradients) with a remote node from the list of neighbor nodes. In one aspect, a link recovery operation may be performed. When a link is repaired, a local node continues normal operation and the deep learning system may continue to progress.

In an additional aspect, a time out operation may be performed for a failure detection operation when no response from neighbor is received after expiration of a defined period of time. Thus, the neighbor node failing to respond and continue using a failure detection operation to prevent a local node from permanently waiting for a failed node/link.

Figure 8A:
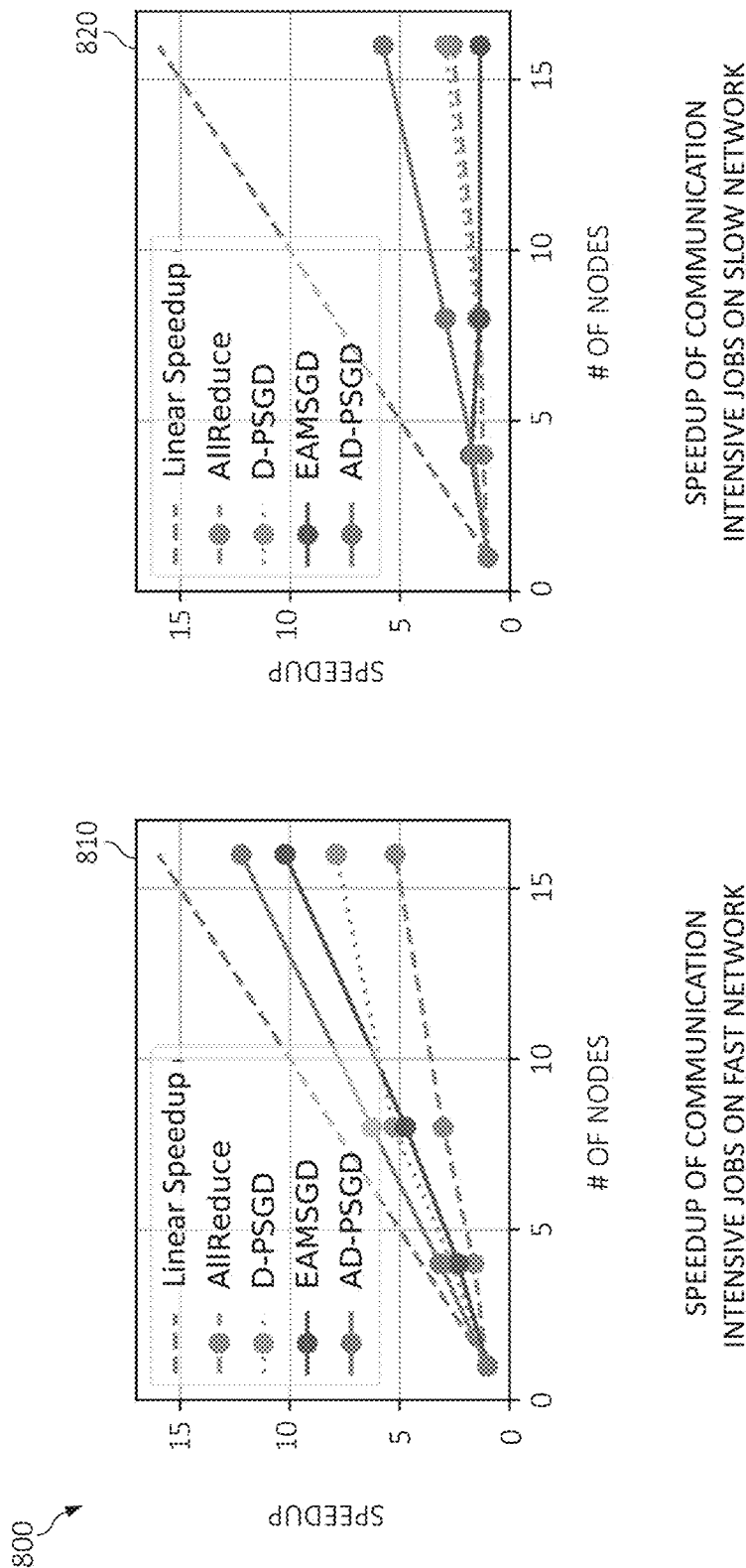
FIG. 8A-8B are graph diagrams depicting operational results from decentralized distributed deep learning according to an embodiment of the present invention.
Figure 8B:
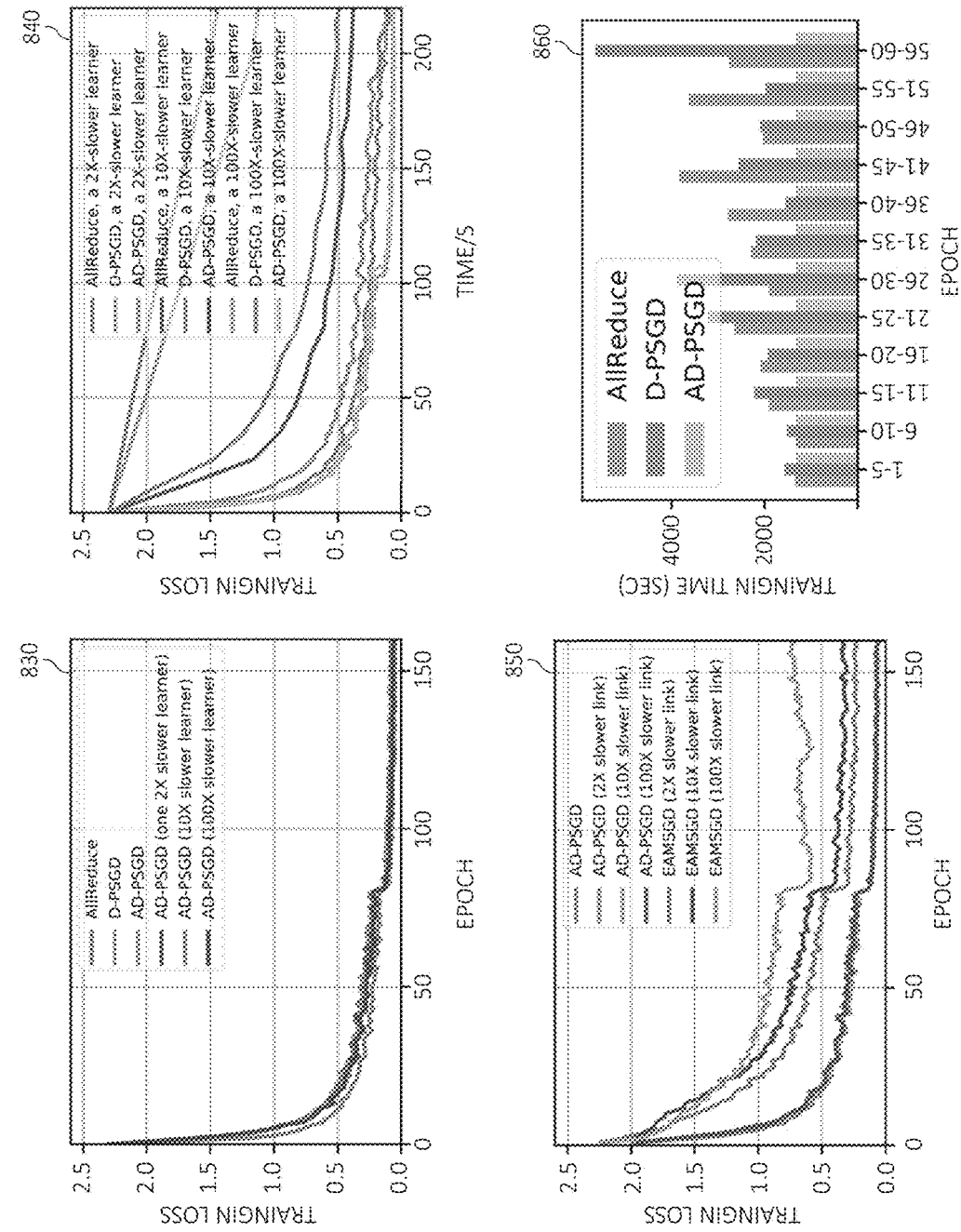

FIG. 8A-8B are graph diagrams depicting operational results from decentralized distributed deep learning. In one aspect, one or more of the components, modules, services, applications, and/or functions described in FIGS. 1-7A-7B may be used to illustrate the operational results displayed in FIG. 8.

That is, FIG. 8A-8B demonstrates the speedup over a single-node performance of different algorithms when using multiple nodes. The diagonal line indicates perfect linear speedup. The algorithm of the AD-PSGD performs the most efficient/accurate (e.g., best) amongst the other algorithms. It should be noted that the algorithms used are a Stochastic Gradient Decent ("SGD"), an AllReduce used from High Performance Computing ("HPC") to compute global averages, a decentralized parallel SGD ("D-PSGD"), elastic asynchronous SGD ("EAMSGD"), and asynchronous decentralized stochastic gradient decent ("AD-PSGD") algorithms.

As illustrated in FIG. 8A, graph 810 depicts an increase in communication speed of intensive jobs on a fast network and graph 810 depicts an increase in communication speed of intensive jobs on a slow network by using the communication operation (e.g., thread 1) to conduct the weigh update operation and communication and use of the computation device (e.g., thread 2) to calculate the gradients.

As illustrated in FIG. 8B, graphs 830 and 840 depicts asynchronous operations using the communication operation (e.g., thread 1) to conduct the weigh update operation and communication and use of the computation device (e.g., thread 2) to calculate the gradients against a slow computing process device for assisting and localizing a slow learner effect. That is, in synchronous schemes such as, for example, the AllReduce algorithm, fast learners have to wait for the slowest learner, therefore slowing down the entire training process. In the asynchronous scheme of the present invention, FIG. 8B shows that even with a very slow learner, the training process using the illustrated embodiments of the present invention does not slow down as much compared with other schemes.

Additionally, graph's 850 and 860 of FIG. 8B illustrate asynchrony and decentralization assisting to localize a slow network link within a pair of learners using the communication operation (e.g., thread 1) to conduct the weigh update operation and communication and use of the computation device (e.g., thread 2) to calculate the gradients.

Figure 9:
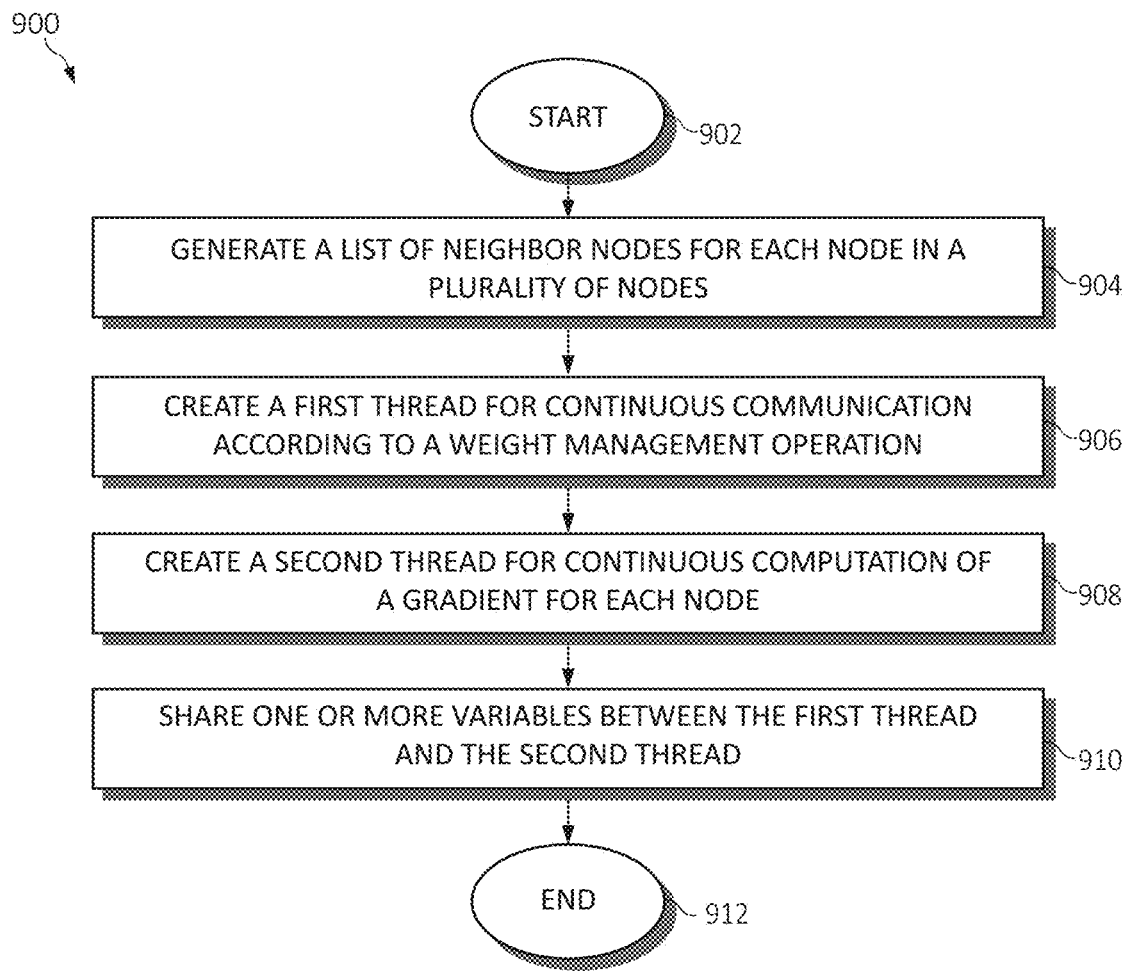
FIG. 9 is a flowchart diagram depicting an exemplary method for decentralized distributed deep learning in a computing environment according to an embodiment of the present invention by a processor, in which aspects of the present invention may be realized.

Turning now to FIG. 9, a method 900 for decentralized distributed deep learning in a computing environment by a processor is depicted, in which various aspects of the illustrated embodiments may be implemented. That is, FIG. 9 is a flowchart of an additional example method 900 for pipelining multi-directional reduction in a computing environment according to an example of the present technology. The functionality 900 may be implemented as a method executed as instructions on a machine, where the instructions are included on at least one computer readable medium or one non-transitory machine-readable storage medium. The functionality 900 may start in block 902.

A list of neighbor nodes may be generated for each node in a plurality of nodes, as in block 904. A first thread may be created for continuous communication according to a weight management operation, as in block 906. A second thread may be created for continuous computation of a gradient for each node, as in block 908. One or more variables between the first thread and the second thread, as in block 910. The functionality 900 may end, as in block 912.

In one aspect, in conjunction with and/or as part of at least one block of FIG. 9, the operations of 900 may include each of the following. The operations of 900 may define the weight management operation to include (e.g., perform the weight management operation by performing each of the following): 1) applying a gradient of a selected node from the list of neighbor nodes obtained second thread to obtain an updated weight of the selected node, 2) setting the gradient equal to a zero value, 3) selecting a neighbor node from the list of neighbor nodes, and/or 4) exchanging weights with the selected neighbor node and averaging the exchanged weights to generate a weighted vector.

The operations of 900 may define the continuous computation of the gradient for the second thread for each of the nodes to include (e.g., perform the continuous computation by performing one or more of the following): 1) continuously determining a gradient for a selected node from the list of neighbor nodes based on input data of the selected node, 2) sending the determined gradient of the selected node to the first thread, and/or 3) assigning weighted vector received from the first thread to a current weight of the selected node.

The operations of 900 may maintain a plurality of required properties by each node included in the list of neighbor nodes, wherein the plurality of required properties to include a connectivity property, a dissemination property, a deadlock free property, and a data consistency property. That is, the plurality of required properties may include the connectivity property where each node included in the list of neighbor nodes are connected, the dissemination property, the deadlock free property to ensure continuous progression of each operation, and the data consistency property. The operations of 900 may detect one or more failures of one or more of the plurality of nodes or links in the list of neighbor nodes.

The operations of 900 may skip a neighbor node in the list of neighbor nodes upon failure to receive a communication response from the neighbor node prior to expiration of a time period, and/or restrict a weight from being updated at a selected node in the list of neighbor nodes when one or more weights are transmitted and averaged to maintain data consistency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for decentralized distributed deep learning in a computing environment by one or more processors comprising:
   performing asynchronous distributed training of one or more machine learning models by generating a list of neighbor nodes for each node in a plurality of nodes and creating a first thread for continuous communication according to a weight management operation and a second thread for continuous computation of a gradient for each node, wherein one or more variables are shared between the first thread and the second thread; and
   in conjunction with performing the asynchronous distributed training, skipping a neighbor node in the list of neighbor nodes upon failure to receive a communication response from the neighbor node prior to expiration of a time period.

2. The method of claim 1, further including defining the weight management operation to include:
   applying a gradient of a selected node from the list of neighbor nodes obtained second thread to obtain an updated weight of the selected node;
   setting the gradient equal to a zero value;
   selecting a neighbor node from the list of neighbor nodes; or
   exchanging weights with the selected neighbor node and averaging exchanged weights to generate a weighted vector.

3. The method of claim 1, further including defining the continuous computation of the gradient for the second thread for each of the nodes to include:
   continuously determining a gradient for a selected node from the list of neighbor nodes based on input data of the selected node;
   sending the determined gradient of the selected node to the first thread;
   assigning weighted vector received from the first thread to a current weight of the selected node.

4. The method of claim 1, further including maintaining a plurality of required properties by each node included in the list of neighbor nodes, wherein the plurality of required properties to include a connectivity property, a dissemination property, a deadlock free property, and a data consistency property.

5. The method of claim 1, further including detect one or more failures of one or more of the plurality of nodes or links in the list of neighbor nodes.

6. The method of claim 1, further including restricting a weight from being updated at a selected node in the list of neighbor nodes when one or more weights are transmitted and averaged to maintain data consistency.

7. A system for decentralized distributed deep learning in a computing environment, comprising:
one or more computers with executable instructions that when executed cause the system to:
perform asynchronous distributed training of one or more machine learning models by generating a list of neighbor nodes for each node in a plurality of nodes and creating a first thread for continuous communication according to a weight management operation and a second thread for continuous computation of a gradient for each node, wherein one or more variables are shared between the first thread and the second thread; and
in conjunction with performing the asynchronous distributed training, skip a neighbor node in the list of neighbor nodes upon failure to receive a communication response from the neighbor node prior to expiration of a time period.

8. The system of claim 7, wherein the executable instructions further define the weight management operation to include:
applying a gradient of a selected node from the list of neighbor nodes obtained second thread to obtain an updated weight of the selected node;
setting the gradient equal to a zero value;
selecting a neighbor node from the list of neighbor nodes; or
exchanging weights with the selected neighbor node and averaging exchanged weights to generate a weighted vector.

9. The system of claim 7, wherein the executable instructions further define the continuous computation of the gradient for the second thread for each of the nodes to include:
continuously determining a gradient for a selected node from the list of neighbor nodes based on input data of the selected node;
sending the determined gradient of the selected node to the first thread;
assigning weighted vector received from the first thread to a current weight of the selected node.

10. The system of claim 7, wherein the executable instructions further maintain a plurality of required properties by each node included in the list of neighbor nodes, wherein the plurality of required properties to include a connectivity property, a dissemination property, a deadlock free property, and a data consistency property.

11. The system of claim 7, wherein the executable instructions further detect one or more failures of one or more of the plurality of nodes or links in the list of neighbor nodes.

12. The system of claim 7, wherein the executable instructions further restrict a weight from being updated at a selected node in the list of neighbor nodes when one or more weights are transmitted and averaged to maintain data consistency.

13. A computer program product for, by a processor, decentralized distributed deep learning in a computing environment, the computer program product comprising a non-transitory computer-readable storage medium having computer-readable program code portions stored therein, the computer-readable program code portions comprising:
an executable portion that performs asynchronous distributed training of one or more machine learning models by generating a list of neighbor nodes for each node in a plurality of nodes and creating a first thread for continuous communication according to a weight management operation and a second thread for continuous computation of a gradient for each node, wherein one or more variables are shared between the first thread and the second thread; and
an executable portion that, in conjunction with performing the asynchronous distributed training, skips a neighbor node in the list of neighbor nodes upon failure to receive a communication response from the neighbor node prior to expiration of a time period.

14. The computer program product of claim 13, further including an executable portion that defines the weight management operation to include:
applying a gradient of a selected node from the list of neighbor nodes obtained second thread to obtain an updated weight of the selected node;
setting the gradient equal to a zero value;
selecting a neighbor node from the list of neighbor nodes; or
exchanging weights with the selected neighbor node and averaging exchanged weights to generate a weighted vector.

15. The computer program product of claim 13, further including an executable portion that defines the continuous computation of the gradient for the second thread for each of the nodes to include:
continuously determining a gradient for a selected node from the list of neighbor nodes based on input data of the selected node;
sending the determined gradient of the selected node to the first thread;
assigning weighted vector received from the first thread to a current weight of the selected node.

16. The computer program product of claim 13, further including an executable portion that maintains a plurality of required properties by each node included in the list of neighbor nodes, wherein the plurality of required properties to include a connectivity property, a dissemination property, a deadlock free property, and a data consistency property.

17. The computer program product of claim 13, further including an executable portion that
detects one or more failures of one or more of the plurality of nodes or links in the list of neighbor nodes.

18. The computer program product of claim 13, further including an executable portion that restricts a weight from being updated at a selected node in the list of neighbor nodes when one or more weights are transmitted and averaged to maintain data consistency.

* * * * *